(12) United States Patent
Evans

(10) Patent No.: US 9,366,235 B2
(45) Date of Patent: Jun. 14, 2016

(54) ESTIMATION OF WIND CONDITIONS AT A WIND TURBINE

(75) Inventor: Martin Evans, London (GB)

(73) Assignee: Vestas Wind Systems A/S, Aarhus N. (DK)

( * ) Notice: Subject to any disclaimer, the term of this patent is extended or adjusted under 35 U.S.C. 154(b) by 701 days.

(21) Appl. No.: 13/805,997

(22) PCT Filed: Jun. 16, 2011

(86) PCT No.: PCT/GB2011/051127
§ 371 (c)(1),
(2), (4) Date: Mar. 4, 2013

(87) PCT Pub. No.: WO2011/161434
PCT Pub. Date: Dec. 29, 2011

(65) Prior Publication Data
US 2013/0161956 A1    Jun. 27, 2013

(30) Foreign Application Priority Data

Jun. 21, 2010 (GB) .................................. 1010400.8

(51) Int. Cl.
| F03D 7/00 | (2006.01) |
| F03D 11/00 | (2006.01) |
| F03D 7/04 | (2006.01) |
| H02P 9/04 | (2006.01) |
| G01W 1/10 | (2006.01) |

(52) U.S. Cl.
CPC .............. *F03D 11/0091* (2013.01); *F03D 7/04* (2013.01); *F03D 7/042* (2013.01); *G01W 1/10* (2013.01); *H02P 9/04* (2013.01); *F05B 2270/32* (2013.01); *F05B 2270/322* (2013.01); *F05B 2270/404* (2013.01); *Y02E 10/722* (2013.01); *Y02E 10/723* (2013.01)

(58) Field of Classification Search
CPC ........... F03D 7/00; F03D 7/045–7/046; F03D 7/048; F03D 9/00; F03D 11/0091
See application file for complete search history.

(56) References Cited

U.S. PATENT DOCUMENTS

| 6,320,272 B1 * | 11/2001 | Lading .................. F03D 7/0224 290/44 |
| 6,850,821 B2 * | 2/2005 | Weitkamp ............. F03D 7/0276 114/39.3 |

FOREIGN PATENT DOCUMENTS

| EP | 2067989 A2 | 6/2009 |
| EP | 2148225 A1 | 1/2010 |
| EP | 2175128 A2 | 4/2010 |

OTHER PUBLICATIONS

Kusiak et al., Dynamic Control of Wind Turbines, Jul. 3, 2009 (Online), Renewable Energy 35, pp. 456-463.*

(Continued)

*Primary Examiner* — Toan Le
(74) *Attorney, Agent, or Firm* — Wood, Herron & Evans, LLP

(57) ABSTRACT

The risk of an extreme gust of wind hitting a wind turbine is estimated by gathering data from one or more sensors for use as training data. This data is acquired over a period of time and is converted in to a feature vector for a given time period by a statistical measure. A number of feature zones are formed, each zone relating to a different estimate of risk with each feature vector being assigned to a risk category. The risk category is defined with reference to the value of one or more chosen turbine parameters at the time the data was acquired. The feature zones are formed from from a measure of distance such as the mean and co-variance of feature vectors from within a given category. Live data is processed by measuring the mahalonobis distance from the feature vector of the live data to the centre of each zone and the risk of an extreme gust is assessed as that of the feature zone to which the mahalonobis distance is lowest.

29 Claims, 5 Drawing Sheets

(56) References Cited

OTHER PUBLICATIONS

Intellectual Property Office, Search and Examination Report issued in corresponding GB Application Serial No. 1010400.8 dated Nov. 10, 2010, 5 pages.

International Searching Authority, Search Report and Written Opinion issued in corresponding International Application No. PCT/GB2011/051127 dated Jan. 25, 2012, 9 pages.

The International Bureau of WIPO, International Preliminary Report on Patentability issued in International Application No. PCT/GB2011/051127 dated Dec. 28, 2012.

* cited by examiner

ESTIMATION OF WIND CONDITIONS AT A WIND TURBINE

FIELD OF INVENTION

This invention relates to wind turbines and in particular to the estimation of wind conditions that will shortly arrive at a wind turbine.

BACKGROUND

It is important for a wind turbine to have advance knowledge of the condition of the wind which will shortly arrive at the turbine. Such advanced knowledge gives the turbine controller sufficient time to adjust operating parameters such as blade pitch angle or rotor speed to match the oncoming conditions. This may be done for a variety of reasons. At lower wind speeds, it is important to adjust the turbine to maximise the energy extracted from the wind. At higher wind speeds it is important to adjust turbine parameters to avoid operations under conditions which might lead to damage. Damage might be caused by a rare extreme event or by cumulative events which reduce the fatigue lifetime of wind turbine components such as the gearbox and the blades.

A number of proposals have been made for determining advance wind conditions. Generally, these include the use of sensors placed on the turbine which observe the upstream wind. An example is shown in EP-A-0970308 which discloses the use of a Lidar or similar remote sensing apparatus mounted on the nacelle of the wind turbine and sensing wind conditions several rotor diameters upstream of the turbine. Based on the sensed conditions, the turbine controller or wind park controller can instruct an individual turbine, or a group of turbines, to change their operating parameters before the sensed wind arrives at the turbine or turbines.

Of particular importance to a wind turbine operator is the ability to detect extreme gusts of wind. Although these may be short lived, they have the potential to cause serious damage to the wind turbine. Although Lidar may be used for gust detections it is not always appropriate. For example Lidar devices are very expensive and may not be considered cost effective by a wind park operator.

We have appreciated that either as an alternative or in addition to remote sensing techniques such as the Lidar of EP-A-0970308, it is desirable to be able to estimate the risk of an extreme gust occurring without the use of expensive additional equipment.

SUMMARY

According to the invention there is provided a method of controlling a wind turbine, comprising the steps of: acquiring and storing training data relating to one or more sensed variable, the training data comprising a feature vector obtained from at least one statistical measure indicative of risk; assigning each of the training data to a risk category based on a measured parameter and defining feature zones for each category from a measure of distance of feature vectors in that category, the feature zones including a high risk zone indicative of a high risk of a gust; and during operation of the wind turbine, determining an estimate of gust risk by calculating a feature vector periodically from data obtained from at least one sensor and determining to which of the feature zones to assign the feature vector, thereby determining an estimate of the risk of an extreme gust represented by the measured feature vector.

The invention also provides a gust risk estimator for a wind turbine comprising: a store of training data relating to one or more variables sensed by the wind turbine, the training data comprising a feature vector obtained from at least one statistical measure indicative of risk; a comparator for comparing each training data item to a measured parameter at the time of acquisition of the training data and assigning each of the training data to a risk category based on the measured parameter; a module for defining feature zones for each category from a measure of distance of feature vectors in that category, the feature zones including a high risk zone indicative of a high risk of a gust; and a module for determining an estimate of gust risk during operation of the wind turbine, by calculating a feature vector periodically from data obtained from at least one sensor associated with the wind turbine and determining to which of the feature zones to assign the feature vector, thereby determining an estimate of the risk of an extreme gust represented by the measured feature vector.

The invention also resides in a wind turbine having a gust risk estimator as defined and in a wind park having a plurality of wind turbines and a gust risk estimator as defined.

Embodiments of the invention have the advantage that gust risk may be estimated without the need for additional potentially expensive sensor devices. Gust risk is determined from historical data relating to a sensed condition together with a reference to a measured parameter which is used to assign a level of risk associated with the sensed condition. This historical data is statistically processed and live data can then be compared to determine whether it indicates a gust risk.

Preferably, the estimate of gust risk is an estimate of extreme gust risk. An extreme gust may cause damage to the wind turbine and the ability to determine a likelihood of such a gust and take action to counter its effects is extremely important to the wind park operator.

Preferably, a gust risk indicative signal is output to a wind turbine controller. This controller may be an individual controller or may control a plurality of turbines. Preferably the controller can overrate the turbines if the estimated gust risk is low and derate the turbines if the gust risk estimate is high. This has the advantage that the turbine power output can be maximised under low risk conditions and the risk of damage to the turbine can be minimised under high risk conditions.

Preferably, the feature zones are defined for each category of risk from the mean, or the mean and covariance of feature vectors in that category. The mean of the feature vectors defines the size of the zones but the covariance dictates the shape of the zones and enables a more accurate assignment of risk category for live data.

Preferably, the feature vector is assigned to a feature zone by measuring the mahalonobis distance from the feature vector to the center of each feature zone and assigning the feature vector to the zone having the smallest mahalanobis distance. Use of the mahalanobis distance has the advantage that the shape and scale of the distribution is taken into account so providing a more accurate assessment of the relevant risk category for live data.

Preferably, the level of risk assigned to a feature vector is based on the value of a measurable parameter such as maximum generator speed following the measurement period in which the data from which the feature vector is derived was obtained.

Preferably, the training data is preloaded into a wind turbine controller. As live feature vectors are calculated they are added to the stored training data. Preferably training data items that have substantially the same value are merged together and their values weighted. This has the advantage that the gust risk estimator can operate from start up of the wind turbine but learn with experience. However, as the life of the turbine may be many years, the merging of data prevents an unmanageable accumulation of data.

BRIEF DESCRIPTION OF THE DRAWINGS

Embodiments of the invention will now be described, by way of example only, and with reference to the accompanying drawings in which.

DETAILED DESCRIPTION

The probability of an extreme gust occurring is influenced by the present conditions. Some of these cannot be measured but can be derived from measured parameters. Historical data can also be looked at to assess the likelihood of a measured or derived parameter indicating an extreme gust.

In the embodiment to be described, training data is acquired by sensors at a wind turbine. This data is used to estimate whether newly acquired live data poses a risk which requires preventative action to be taken. Thus, the risk of an extreme gust is estimated based on preceding time signals. Additionally, if the estimated risk is low, the turbine may be operated in a mode which generates more power than would be safe if the gust risk were higher. An extreme gust is defined in International Standard IEC 61400-1 2005 at Chapter 6.3.2 and refers to a highly unusual gust that, statistically, will only occur extremely infrequently. The embodiments described below are particularly suited to estimating the risk of an extreme gust but can also be used to detect gusts which do not fall within the definition of extreme gusts but which, nevertheless, have the potential to cause damage or contribute to damage, for example by reducing the fatigue life of one or more turbine components.

The training data is analysed such that a characteristic of the data is used as an indicator of upcoming risk. This characteristic may be one of many that can be measured or derived and may be different for different turbines in a wind park. This difference may be necessitated by the surrounding topography of the turbines. For example, the training data may be taken from one or more sensors. A typical large scale commercial wind turbine has many sensors which measure and monitor both ambient climatic conditions and turbine parameters. These sensors may measure one of a number of variables including, but not limited to, ambient conditions such as wind speed, temperature, pressure etc. and generator parameters such as generators speed, generator temperature, blade pitch angle and rotor speed. Measurements may be taken on one or more time scales. The characteristic that is measured may be a statistic or combination of statistics such as, but not limited to, mean, standard deviation, skew, kurtosis, higher-order statistics, incremental statistics, and spectral statistics.

Figure 1:
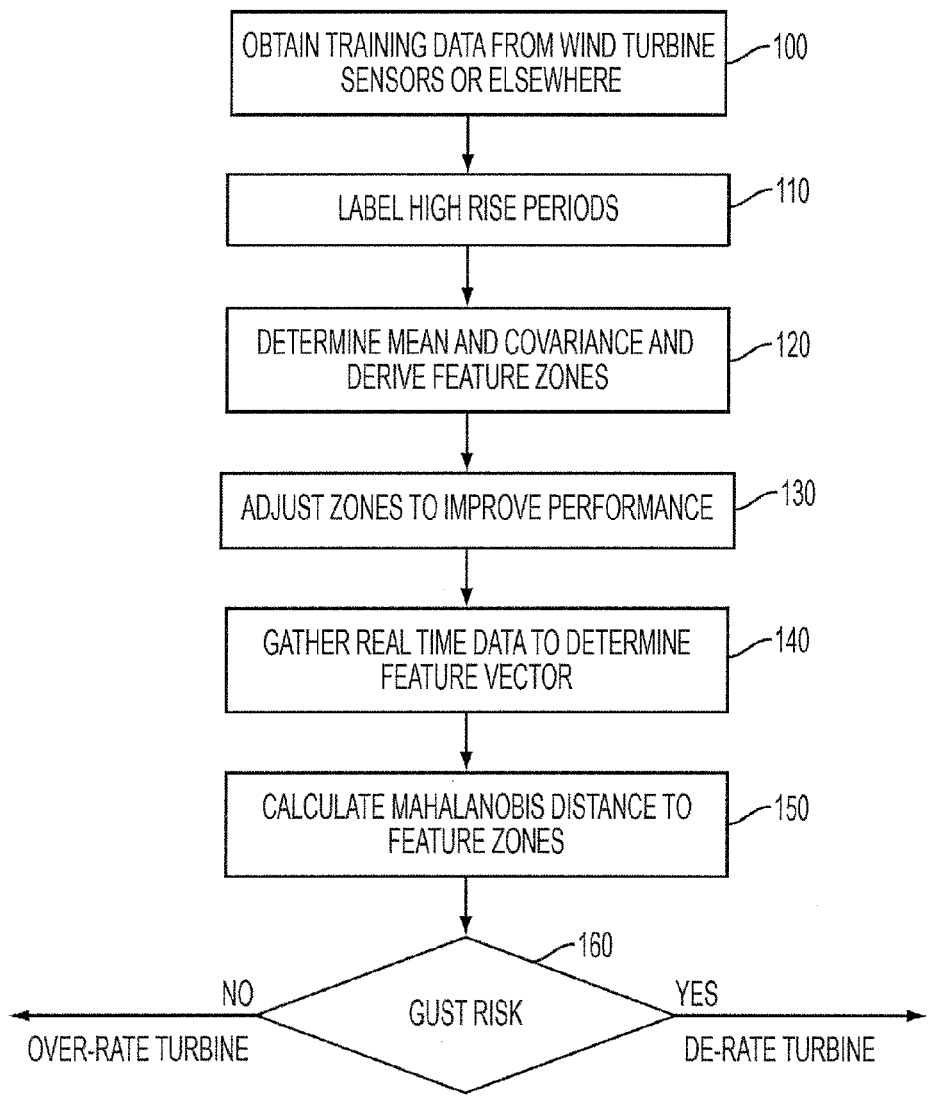
FIG. 1 is a flow chart illustrating steps of a preferred embodiment of the invention.

FIG. 1 is a flow chart which indicates how the measured statistical information is used to obtain an estimate of the risk of an extreme gust. At step 100 training data is obtained which is subsequently used as the basis against which live data is analysed to estimate extreme gust risk. Prior to live operation, training data is recorded either at the wind turbine under consideration or at a similar site. The data may be obtained from any of the sensors mentioned above and is entered into the system. The chosen statistical measures are found for each time period and stored in one feature vector for each period.

At step 110, the training data is analysed to label the high risk periods as such. This may be done in a variety of ways. For example, the maximum generator speed that followed each period may be considered. Where that speed exceeded a predetermined value, the risk may be designated as high.

At step 120, the feature vectors are arranged into feature zones based on a measure of distance, for example the mean $\mu_j$ and covariance $S_j$ of the feature vectors. For each feature vector, the $_j$ indicates which zone it is. A number of zones are defined, for example, indicating high risk, low risk, medium, very high risk, etc. The number of zones is flexible and will depend on the degree of control that it is desired to exert based on the estimate of gust risk.

At step 130, the zones are adjusted to improve performance. The adjustment may include, for example, the removal of outliers followed by recalculation of the zones.

Step 140 is the real-time operation of the extreme gust risk estimator. A real-time feature vector is calculated from measurements from the chosen sensor or sensors. A determination is then made as to whether the current conditions are considered to be high risk. At step 150 the mahalanobis distance r between the feature vector and a high risk and a low risk feature zone is calculated. The conditions are considered high risk if the feature vector has a lower mahalanobis distance to a high risk feature zone than a low risk zone. This may be expressed by:

$$r_j = \sqrt{(x-\mu_j)^T S_j^{-1}(x-\mu_j)}$$

Where x is the present, live streaming, feature vector.

At step 160, the controller estimates whether or not there is a high gust risk based on the previous analysis. If there is no high risk detected, the system may merely continue to process live data. If a high risk is detected, then as well as continuing to process live data, a gust risk signal is output to another part of the controller which may then, depending on other sensed and controlled parameters, take evasive action and derate the turbine, for example by changing the blade pitch angle, by changing the rotor speed or through some other parameter. In extreme cases the controller may shut down the turbine or cause the nacelle and rotor to yaw out of the wind to avoid catastrophic damage.

The process described may either be performed by the controller of an individual wind turbine or by a controller which controls several wind turbines, for example, a wind turbine controller or a controller which controls part of a wind park. A combination of the two may be used. For example, the determination of extreme gust risk may be made by a single turbine controller which may then exercise control over itself as well as sending an extreme gust risk signal to a higher level controller such as a wind park controller.

Thus, where the calculation at step 150 indicates a high risk of an extreme gust, the controller acts to de-rate the turbine. However, where the calculation indicates a risk that is lower than a given threshold risk, the controller may overrate the turbine enabling power to be generated at above the rated output of the turbine with minimal risk of damage to turbine components.

Figure 2:
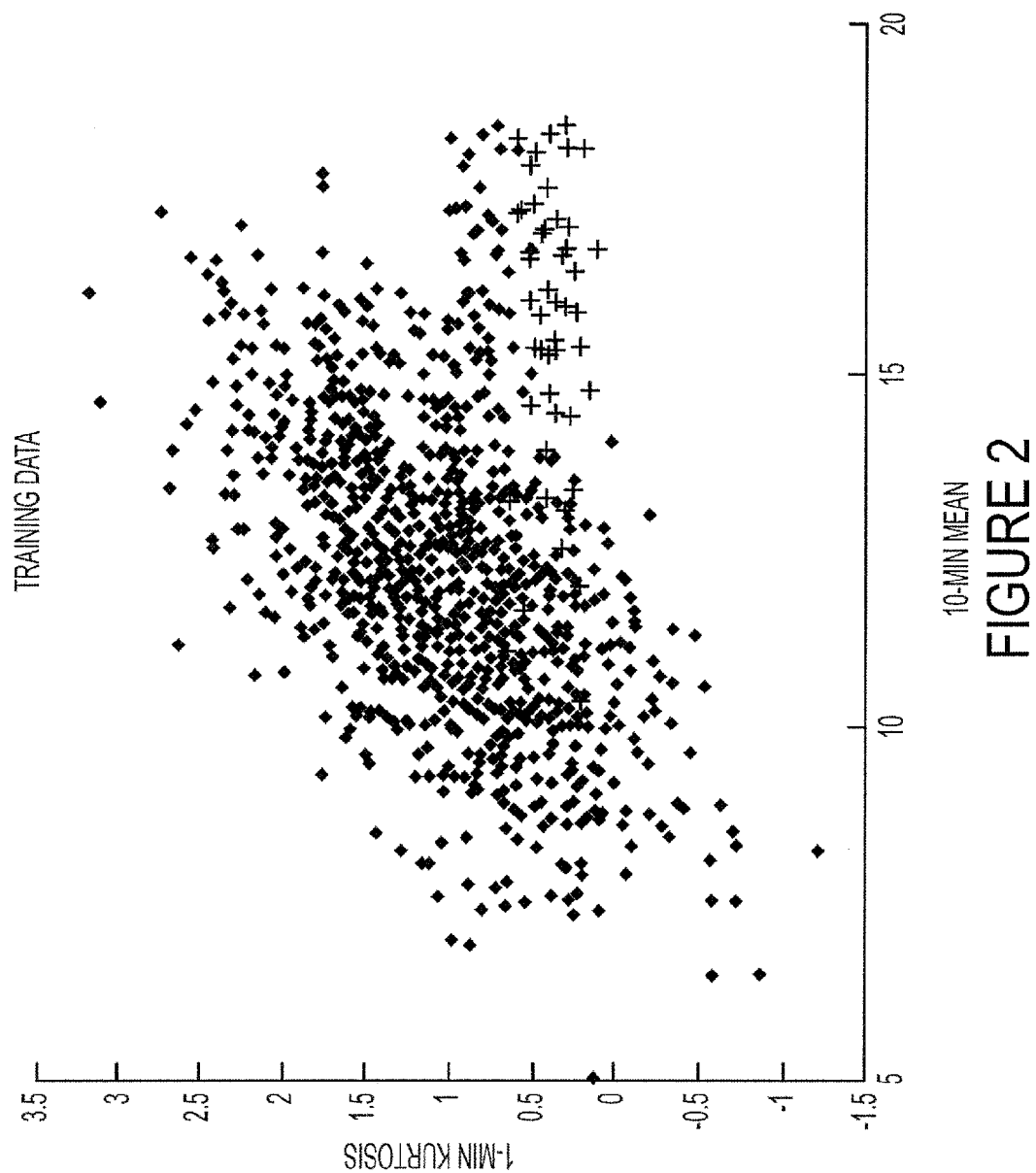
FIG. 2 is a plot of training data which enables gust risk to be estimated.
Figure 3:
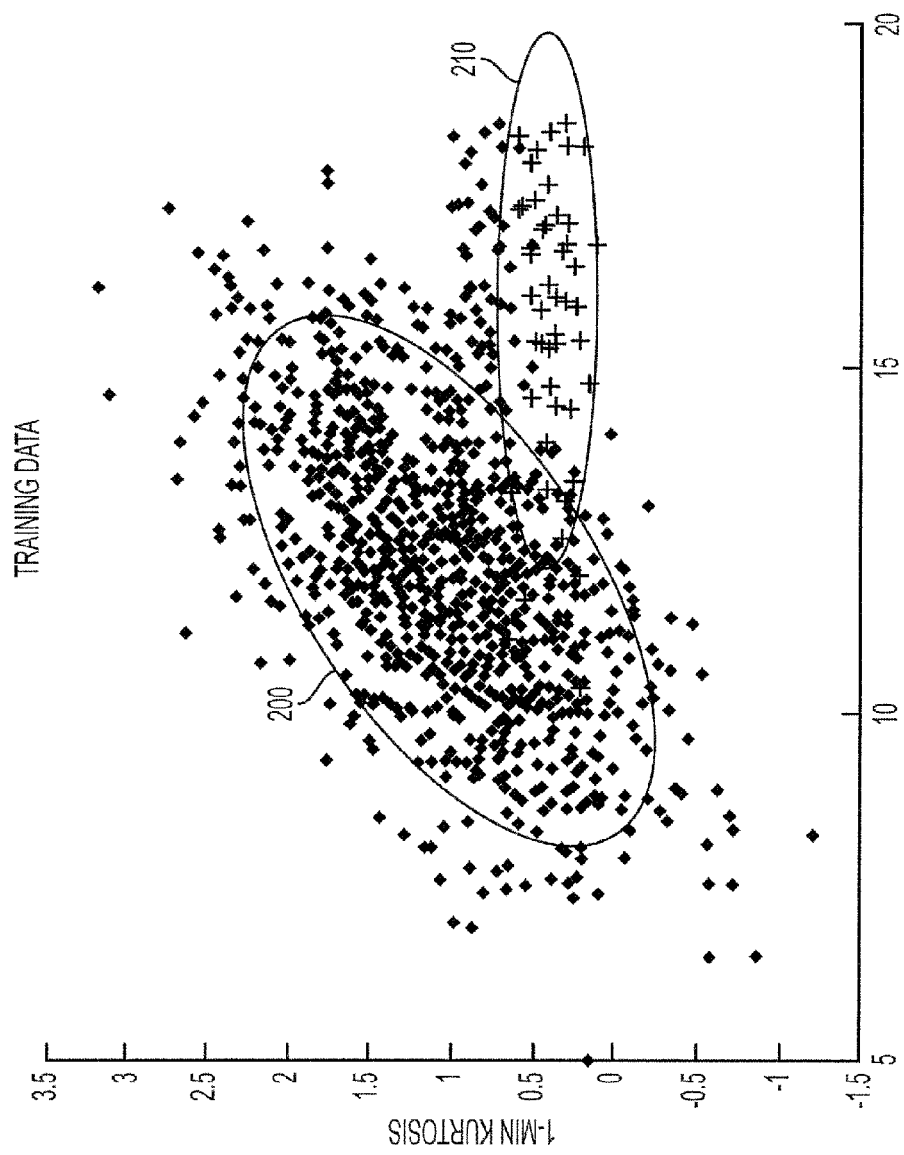
FIG. 3 shows how the training data of FIG. 1 can be divided into feature zones.
Figure 4:
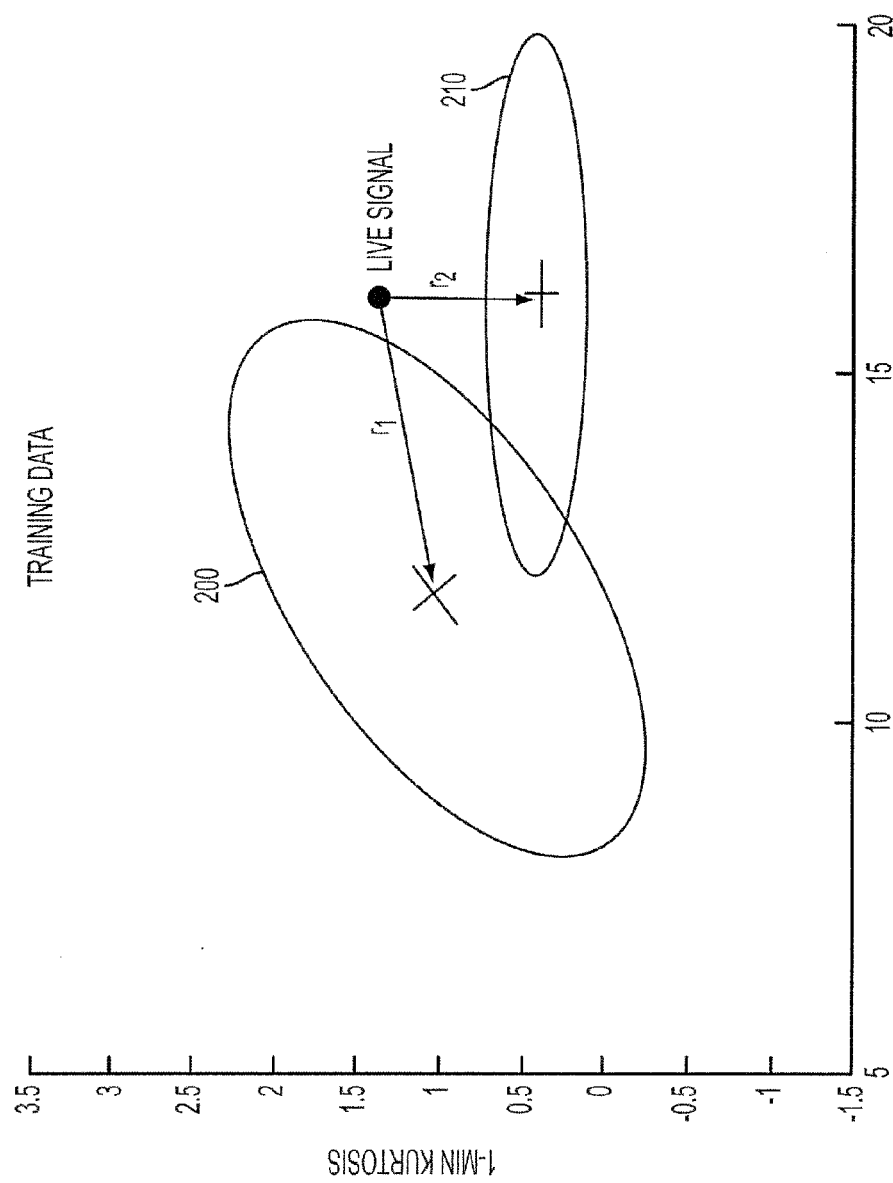
FIG. 4 shows how newly acquired live data can be assessed in relation to the feature zones.

FIGS. 2 to 4 show a simple example of the method described with respect to FIG. 1 to aid explanation. FIG. 2 shows the training data. In this example, the feature vector is ten minute and one minute wind speeds. This data may have been obtained from a turbine sensor such as an anemometer or may have been acquired from a neighbouring turbine or a turbine sited under similar topographic conditions. The feature vectors in this simple case are two dimensional and are plotted on a graph of one minute kurtosis against ten minute mean. In this example low risk data is shown with diamond points and high risk in shown with crosses. Risk is defined as high if the ten minute maximum generator speed is reached. If it is desired to define several risk thresholds, such as high, fairly high, medium, fairly low, low, etc. a range of generator speeds, or other chosen risk determining variable may be set. The designation of risk may be linked to more than one variable and that or those variables need not be generator parameters but may be some other measured value such as air pressure. Thus, this is merely an example and any other definition of risk may be adopted.

Thus, FIG. 2 corresponds to steps 100 and 110 in FIG. 1. Steps 120 and 130 are represented by FIG. 3 in which feature zones 200 and 210 are created by finding a mean and covariance of the like-labelled zones. The mean corresponds to the location and covariance corresponds to the shape and size. Thus, in the example of FIG. 3 the diamond feature vectors are generally grouped within the low risk zone 200, whereas the crosses, high risk, feature vectors are generally grouped within the smaller high risk zone 210. It will be apparent that there are many values that fall outside. The center of the feature zone is determined by the mean position, whereas the shape is determined by the spacing and covariance of the values. Thus, it is possible for certain values to be outside the zones. It would be possible to define the zones using a different measure of distance or by only using the mean but it is presently preferred to use both mean and covariance.

As training data is obtained over time, it may be necessary to reduce the amount of data acquired over the twenty year lifetime of a wind turbine. Point measurements may be merged together if they are very close and values of points may be weighted accordingly.

FIG. 4 shows step 150 of FIG. 1. Here, live data is shown as a live signal 300 which is plotted on the graph of kurtosis against mean. The mahalonobis distance from the live signal data to the centers of each of the feature zones is created and the feature zone to which the live data is assigned, and therefore the level of risk, is that which has the lowest mahalonobis distance. Thus, in FIG. 4, the distance R1 to the center of the low risk feature zone is lower than the distance R2 to the center of the high risk zone indicating that the data shows a low risk of an extreme gust.

The use of mahalonobis distances takes into account the shape of the feature zones. In FIG. 4 the distance to the center of the shape 200 is about 1.5 radiuses of the low risk shape, whereas the distance to the center of the high risk shape is about 3 radiuses of that shape. As mentioned above, some other measure of distance could be used. If the mean was the only measure, which is possible, it can be seen that the live signal could be considered to be nearer the danger zone (210) than the safe zone (200). However, when the shapes of the distributions are taken into account the danger zone is much further away than the safe zone. This can be seen from the figure as the live signal is near the edge of the ellipse for the safe zone but would still be outside the ellipse for the danger zone even if it were scaled up by a factor of 2.

The method described requires a considerable amount of training data to be input before it can become effective. To enable the method to be used when a turbine is first erected, the turbine controller requires preloading with training data or parameters that it can run from the outset. It is advantageous, however, for the turbine to adjust these parameters and models as it learns more about its surroundings. This may be done by comparing the predicted risk with the resulting severity to determine the accuracy of the models. Models where the prediction matches well with the actual results are kept and models with a poorer correlation can be adjusted by learning. At a point during the life of the turbine, which is usually intended to be twenty years, the controller should weight its experience since running more highly than its inherited knowledge that came pre-installed.

Figure 5:
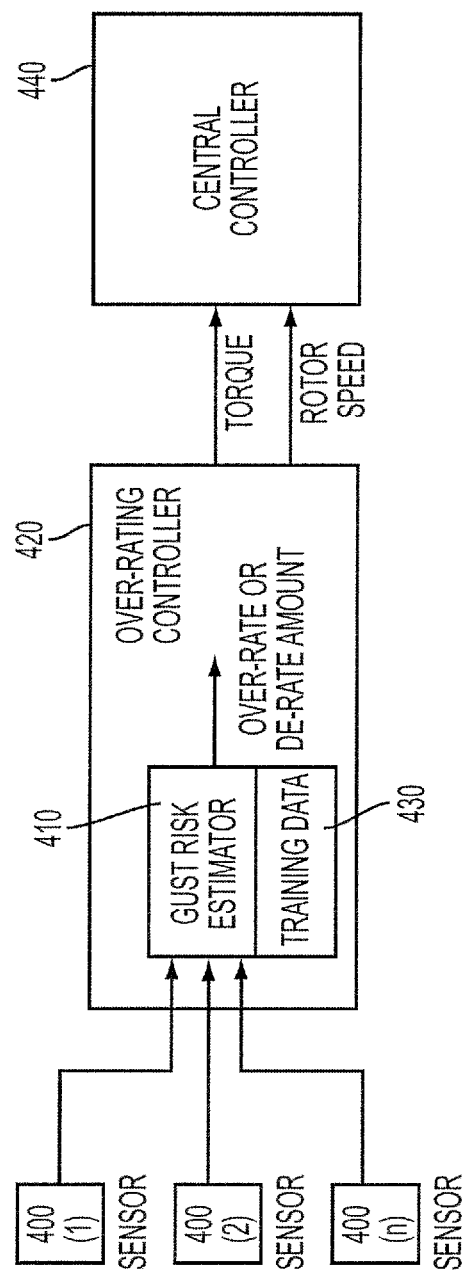
FIG. 5 is a schematic diagram of a wind turbine controller including a gust risk estimator embodying the invention.

FIG. 5 is a schematic diagram illustrating a control system embodying the method described above. A wind turbine includes a plurality of sensors 400(1) . . . (n). A typical large scale commercial sensor may include up to 30 different sensors which will measure wind parameters such as wind speed, direction, temperature, pressure etc and turbine parameters, for example, rotor speed, blade pitch, generator speed, generator temperature etc. Although not measured directly, the controller can also derive values for various parameters from actual measured values. Selected ones of these sensor inputs are used by the gust risk estimator 410 which forms a part of controller 420. The gust risk estimator also includes a store 430 of training data to which live data from the sensors, subject to statistical treatment as described, is added. The gust risk estimator can output an overrating or a de-rating signal to the controller which indicates to the controller that, based on the estimate of gust risk, the wind turbine can be operated in an overrated condition or should be de-rated. This signal is used by the controller together with various other controller inputs and algorithms to determine output control signals such as pitch and speed which are communicated back to the turbine. The controller can also output signals to a central controller to enable estimations of gust risk to be used to control more than wind turbine of a wind park. In one preferred embodiment of the invention each turbine of a wind park can estimate gust risk using data from its own sensors. However, when a high gust risk is determined by one turbine a warning signal is communicated to other turbines via a park controller. In another embodiment, a plurality of turbines may commence operation with the same set of training data but modify that training data with their own respective data. This makes initiation of the system simpler whilst retaining the benefits of individual learning over time.

Embodiments of the invention have the advantage that they enable gust risks such as extreme gust risk to be estimated without the need for expensive forward looking sensors such as Lidar. At present, this is not possible. Gust risk may be estimated at individual turbines or may be estimated globally at the central power plant controller to give a more informed risk estimate than single turbines. Turbines may be operated more safely when they are aware of the gust risk as they can be de-rated. Additionally, turbines can operate more efficiently and profitably when informed that there is a low gust risk so maximising both the income generated by the turbine and the lifetime of the turbine.

The invention may also be extended to detect extreme changes of wind direction or extreme wind sheer events Various other modifications to the gust risk estimator described are possible and will occur to those skilled in the art without departing from the invention which is defined by the following claims.

The invention claimed is:

1. A method of controlling a wind turbine, comprising:
  acquiring and storing training data relating to one or more sensed variables, wherein the training data includes a feature vector obtained from at least one statistical measure indicative of risk;
  assigning each of the training data to a risk category based on a measured parameter and defining feature zones for each category from at least a measure of distance of feature vectors in that category, the feature zones including a high risk zone indicative of a high risk of a gust; and during operation of the wind turbine, determining an estimate of gust risk by calculating a feature vector periodically from data obtained from at least one sensor and determining to which of the feature zones to assign the feature vector, thereby determining an estimate of the risk of an extreme gust represented by the measured feature vector, wherein the feature vector is assigned to a feature zone by measuring the mahalonobis distance from the feature vector to the centre of each feature zone and assigning the feature vector to the zone having the smallest mahalonobis distance from the feature vector; and adjusting the wind turbine to de-rate the wind turbine when the estimate of gust risk is above a threshold to prevent damage to the wind turbine.

2. The method according to claim 1, comprising outputting a gust risk indicative signal to a wind turbine controller.

3. The method according to claim 1, wherein the feature zones are defined for each category of risk from the mean of feature vectors in that category.

4. The method according to claim 1, wherein the feature zones are defined for each category of risk from the mean and covariance of feature vectors in that category.

5. The method according to claim 1, wherein the feature vectors are based on mean wind speeds.

6. The method according to claim 1, comprising adjusting the feature zones in response to real time measurements.

7. The method according to claim 1, comprising overrating the wind turbine when the estimate of the risk of an extreme gust is low.

8. The method according to claim 1, wherein the gust risk estimate is output to a controller controlling two or more wind turbines.

9. The method according to claim 1, wherein the level of risk assigned to a feature vector is based on the value of a measurable parameter following the measurement period in which the data from which the feature vector is derived was obtained.

10. The method according to claim 1, wherein a feature vector is assigned a level of risk related to the maximum generator speed that followed the measurement period.

11. The method according to claim 1, wherein the training data is preloaded into a wind turbine controller.

12. The method according to claim 1, wherein the feature vector calculated periodically from sensor data is added to the stored training data.

13. The method according to claim 12, comprising merging training data items together that have substantially the same value and weighting the values of the merged items.

14. The method according to claim 1, wherein the estimate of gust risk is an estimate of an extreme gust.

15. A gust risk estimator for a wind turbine comprising:
a store of training data relating to one or more variables sensed by the wind turbine, wherein the training data includes a feature vector obtained from at least one statistical measure indicative of risk;
a comparator configured to compare each training data item to a measured parameter at the time of acquisition of the training data and assign each of the training data to a risk category based on the measured parameter;
a module configured to define feature zones for each category from a measure of distance of feature vectors in that category, the feature zones including a high risk zone indicative of a high risk of a gust; and
a module configured to determine an estimate of gust risk during operation of the wind turbine, by calculating a feature vector periodically from data obtained from at least one sensor associated with the wind turbine and determining to which of the feature zones to assign the feature vector, thereby determining an estimate of the risk of an extreme gust represented by the measured feature vector, wherein the module for determining an estimate of gust risk assigns a feature vector to a feature zone by measuring the mahalonobis distance from the feature vector to the centre of each feature zone and assigning the feature vector to the zone having the smallest mahalonobis distance from the feature vector; and
a controller configured to adjust the wind turbine to de-rate the wind turbine when the estimate of gust risk is above a threshold to prevent damage to the wind turbine.

16. The gust risk estimator according to claim 15, wherein the module for determining an estimate of gust risk outputs a gust risk indicative signal to a wind turbine controller.

17. The gust risk estimator according to claim 16, wherein the wind turbine controller controls the wind turbine from which the data processed by the gust risk estimator is obtained.

18. The gust risk estimator according to claim 16, wherein the controller controls a plurality of wind turbines.

19. The gust risk estimator according to claim 15, wherein the module for defining feature zones defines feature zones for each category of risk from the mean of feature vectors in that category.

20. The gust risk estimator according to claim 15, wherein the module for defining feature zones defines feature zones for each category of risk from the mean and covariance of feature vectors in that category.

21. The gust risk estimator according to claim 15, wherein the feature vectors are based on mean wind speeds.

22. The gust risk estimator according to claim 15, wherein the controller is operable to overrate the wind turbine when the estimate of the risk of an extreme gust is low.

23. The gust risk estimator according to claim 15, wherein the comparator assigns a level of risk to a feature vector based on the value of a measurable parameter following the measurement period in which the data from which the feature vector is derived was obtained.

24. The gust risk estimator according to claim 15, wherein the comparator assigns to a feature vector a level of risk related to the maximum wind turbine generator speed that followed the measurement period.

25. The gust risk estimator according to claim 15, wherein the feature vector calculated periodically from sensor data is added to the stored training data.

26. The gust risk estimator according to claim 25, wherein training data items that have substantially the same value are merged together and weighted in the store.

27. The gust risk estimator according to claim 15, wherein the estimate of gust risk is an estimate of extreme gust risk.

28. A wind turbine having a gust risk estimator according to claim 15.

29. A wind park having a plurality of wind turbines and a gust risk estimator according to claim 15.

* * * * *